Patented July 17, 1934

1,966,864

UNITED STATES PATENT OFFICE 1,966,864

CEMENTITIOUS MATERIAL OF THE HIGH ALUMINA TYPE

Norman Victor Sydney Knibbs, Longfield, England

No Drawing. Application August 27, 1932, Serial No. 630,747. In Great Britain September 14, 1931

4 Claims. (Cl. 106—25)

This invention relates to the production of cementitious material of the high alumina type.

Generally, cementitious material of this type is formed by heating mixtures of calcareous material and highly aluminous material, such as bauxite, under conditions adapted to secure fusion or substantial fusion of the mixture.

It has, however, been proposed to subject such mixtures to prolonged heating at lower temperatures, thus avoiding fusion, in order to obtain a mass which can be more readily ground.

There is known a process of producing cements of the type in question by subjecting a mixture of highly aluminous material and caustic lime to treatment in the presence of steam (preferably under elevated pressure) in order to secure a reaction between the lime and the constituents of the aluminous material and thereafter subjecting the resultant product to treatment at an elevated temperature which is normally, however, considerably below that at which fusion would result and may be in the neighbourhood of 1000° C.

The product thus obtained is a cementitious material having the normal setting properties of an aluminous content.

On the other hand, if such a mixture is heated to considerably lower temperatures which are merely sufficient to expel the combined water, a product having a "flash set" and of poor cementitious qualities is obtained.

The invention is based upon the observation that by treating with carbon dioxide, masses consisting of compounds of alumina with lime in proportions adapted to yield hydraulic cements of the high alumina type, or even a higher proportion of lime, certain desirable results may be secured.

The invention consists, broadly, in the process of producing hydraulic cements of the high alumina type which comprises subjecting products obtained by the treatment of mixtures of highly aluminous material and lime, under conditions whereby calcium aluminates are formed, to the action of carbon dioxide to an extent adapted to secure a limited degree of conversion of the total lime present in such products into calcium carbonate.

The treatment with carbon dioxide is, normally, continued until no more of it is taken up and in such case the degree of carbonation may be regarded as that which has resulted in the conversion of any free lime and any loosely combined lime into calcium carbonate. From my experiments it would seem that tricalcium aluminate is decomposed by the carbon dioxide with the formation of dicalcium aluminate or pentacalcium trialuminate and calcium carbonate.

Generally speaking, the final cement has a carbon dioxide content of from 12 to 17 per cent. but, depending upon the proportions of lime and bauxite used, it may vary between much wider limits.

The invention, more particularly, consists in the process of producing hydraulic cements of the high alumina type which comprises subjecting the product obtained by the treatment of a mixture of lime and bauxite or other highly aluminous material with steam, preferably at elevated pressure, to the action of carbon dioxide whereby a limited degree of carbonation of the total lime is secured and to heat treatment at a temperature sufficient to drive off the combined water.

Preferably, in such case the treatment of the material with carbon dioxide and the heating of the material to drive off water may be effected simultaneously.

For instance, in accordance with the invention, lime and bauxite in finely divided form and in the proportion of about equal parts by weight may be subjected to the action of steam and the steamed mixture thus obtained may then be passed through an inclined rotating tube, such as a Portland cement kiln or a rotary drier, through which is also passed in countercurrent to the cementitious material a current of hot gases containing carbon dioxide. The temperature of these gases may be 500 to 700° C. at the point at which they enter the tube. Some of the carbon dioxide will be absorbed by the mixture, and the material coming from the kiln, after cooling and grinding if necessary, is a cement which has a setting time sufficiently long to permit of its being used in the ordinary way.

The temperature at which the treatment is carried out may vary within certain limits, and generally temperatures between 300° C. and 900° C. are suitable; above the maximum temperature mentioned, carbon dioxide will be driven off. By varying the temperature, variation within wide limits of the setting and other properties of the product may be secured.

Ordinarily, I have found that below about 500° C. the dehydration and the absorption of carbon dioxide become rather slow and it is generally preferably to work with a maximum temperature between 500° and 700° C.

There are many other ways of carrying out the process and the low temperature required allows a wide choice of apparatus. If desired, the treatment with carbon dioxide may form a separate operation from the heat treatment to drive off the water, but ordinarily it is convenient to carry out the two operations together, using hot combustion gases or waste gases from furnaces or kilns for the provision of both heat and carbon dioxide.

The following particulars are given by way of example to illustrate a suitable manner of carrying the invention into effect:—

Bauxite containing 55 per cent. alumina and 5 per cent. silica is ground to a fineness of 90 per cent. passing a 100 mesh sieve and mixed with 1.8 times its weight of water to form a slurry. A weight of lime (containing 95 per cent. calcium oxide) equal to the weight of bauxite is added to the bauxite slurry, where it slakes, the resulting slurry being just thin enough to pump. This slurry, containing hydrated lime and bauxite, is pumped or run to a pressure vessel consisting of a horizontal boiler shell with a slow-running axially arranged agitator in it, and steam at 200 lb. from a boiler is turned into the pressure vessel. This pressure and the agitation are maintained for a period of three hours after which the pressure is reduced to atmospheric by blowing off steam. The steamed slurry is then pumped to the heat treatment plant consisting of an inclined rotating cylinder lined with brick. Hot gases at 650° enter the cylinder at the lower end and pass through counter to the flow of slurry which they dry to a powder. Combination of the carbon dioxide in the hot gases with the cement takes place and also the combined water is driven off. The cement leaves the heat treatment cylinder as a hot powder and it is passed through another smaller rotating cylinder to cool it. It is then passed through a pebble mill for grinding.

In the above example, a relatively large amount of water is employed to obtain a row mixture in the form of a slurry adapted to be easily handled by mechanical means. A semi-dry raw mixture may, however, equally well be used in carrying the invention into effect with an appropriate mechanical arrangement for feeding and otherwise dealing with the mixture and the treatment with carbon dioxide containing gases may then be effected by a smaller volume of hot gases.

The cement produced in accordance with the invention is generally improved in strength by a limited degree of exposure to moist air. One way by which this may be effected is by adding moisture, as for example waste steam, to the air passing through the cooler used to cool the cement coming from the rotating heat treatment cylinder.

In general, the cement produced resembles other aluminous cements in attaining great strength in 24 hours and less. It has the great advantage over other aluminous cements of being highly plastic when mixed with water so that it spreads and flows well when used as plaster, mortar or concrete. Where, as is generally the case, the raw mixture is prepared from bauxite and lime and the mixture is not subjected to extremely high temperatures, the cement will retain the colour, generally red, of the bauxite used in its production.

Having now described my invention, what I claim as new and desire to secure by Letters Patent is:—

1. The process of producing hydraulic cements of the high alumina type from bauxite and other materials consisting essentially of free alumina which comprises subjecting a mixture of such material and lime to the action of steam under a pressure greater than atmospheric pressure whereby hydrated calcium aluminates are formed, subjecting the product thus obtained to heat treatment at a temperature sufficient to drive off the combined water, and to the action of carbon dioxide until any free lime present and substantially one-third of the lime in combination with alumina is converted into calcium carbonate.

2. The process of producing hydraulic cements of the high alumina type from bauxite and other materials consisting essentially of free alumina which comprises subjecting a mixture of such material and lime in proportions substantially corresponding with one molecule of alumina to 3 molecules of lime to the action of steam under a pressure greater than atmospheric pressure, subjecting the product thus obtained to heat treatment at a temperature sufficient to drive off the combined water, and to the action of carbon dioxide until any free lime present and substantially one-third of the lime combined with alumina in the said product is converted into calcium carbonate.

3. The process of producing hydraulic cements of the high alumina type from bauxite and other materials consisting essentially of free alumina which comprises subjecting a mixture of such material and lime in proportions substantially corresponding with one molecule of alumina to 3 molecules of lime to the action of steam under a pressure greater than atmospheric pressure subjecting the product thus obtained to a temperature lying within the limits 300 and 900° C. and simultaneously to the action of carbon dioxide until any free lime present and the lime loosely combined with alumina is converted into calcium carbonate.

4. The process of producing hydraulic cements of the high alumina type from bauxite and other materials consisting essentially of free alumina which comprises subjecting a mixture of such material and lime to treatment with steam under a pressure greater than atmospheric pressure whereby hydrated calcium aluminates are formed and subjecting the resulting product simultaneously to the action of carbon dioxide and heat until any free lime present and lime loosely combined with alumina is converted into calcium carbonate and the combined water is driven off.

NORMAN VICTOR SYDNEY KNIBBS.